April 13, 1926. 1,580,437
R. J. LEARY
MOLDING MACHINE
Filed Dec. 12, 1924 2 Sheets-Sheet 1
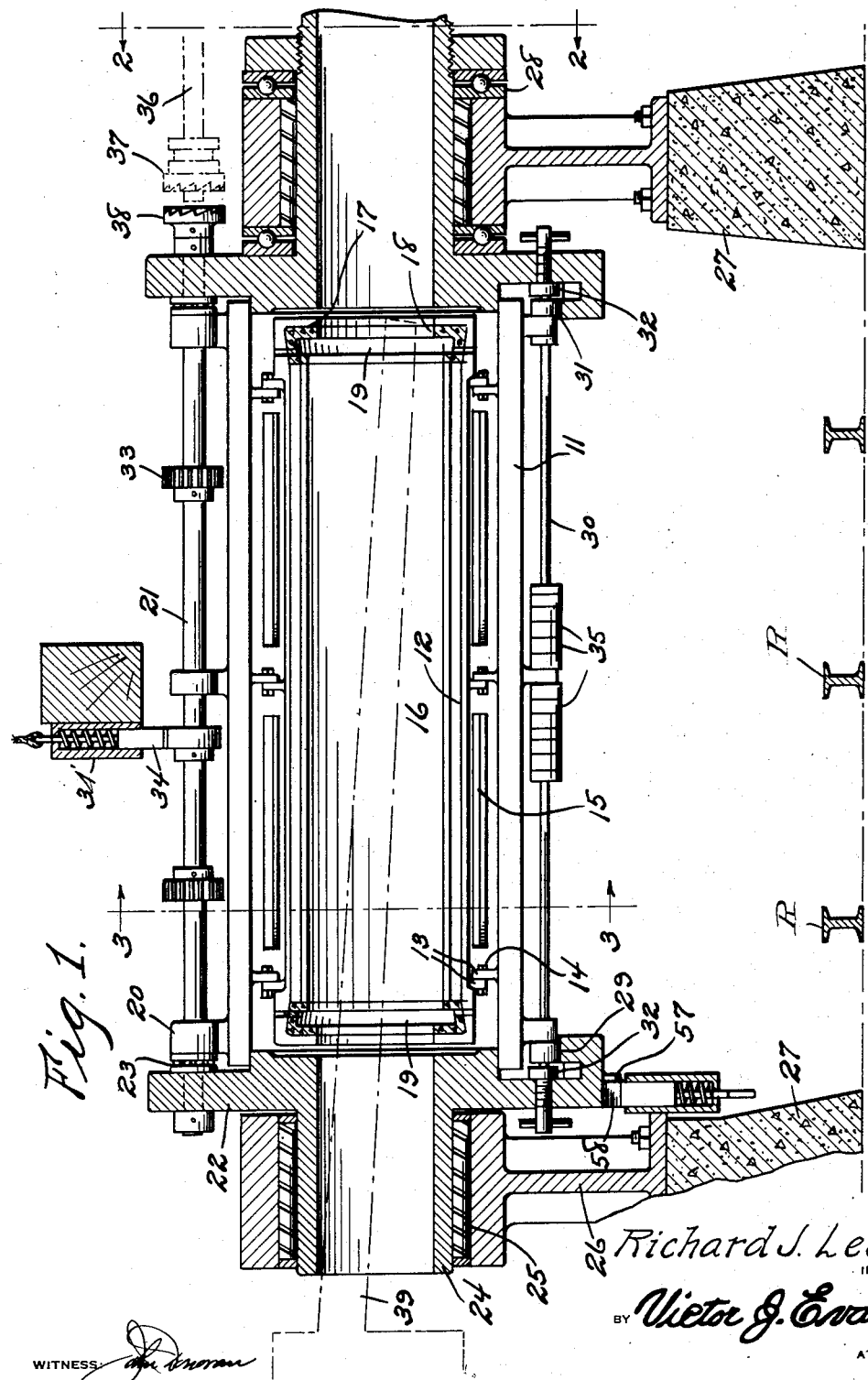
Richard J. Leary
INVENTOR
BY Victor J. Evans
ATTORNEY April 13, 1926.
R. J. LEARY
MOLDING MACHINE
Filed Dec. 12, 1924
1,580,437
2 Sheets-Sheet 2
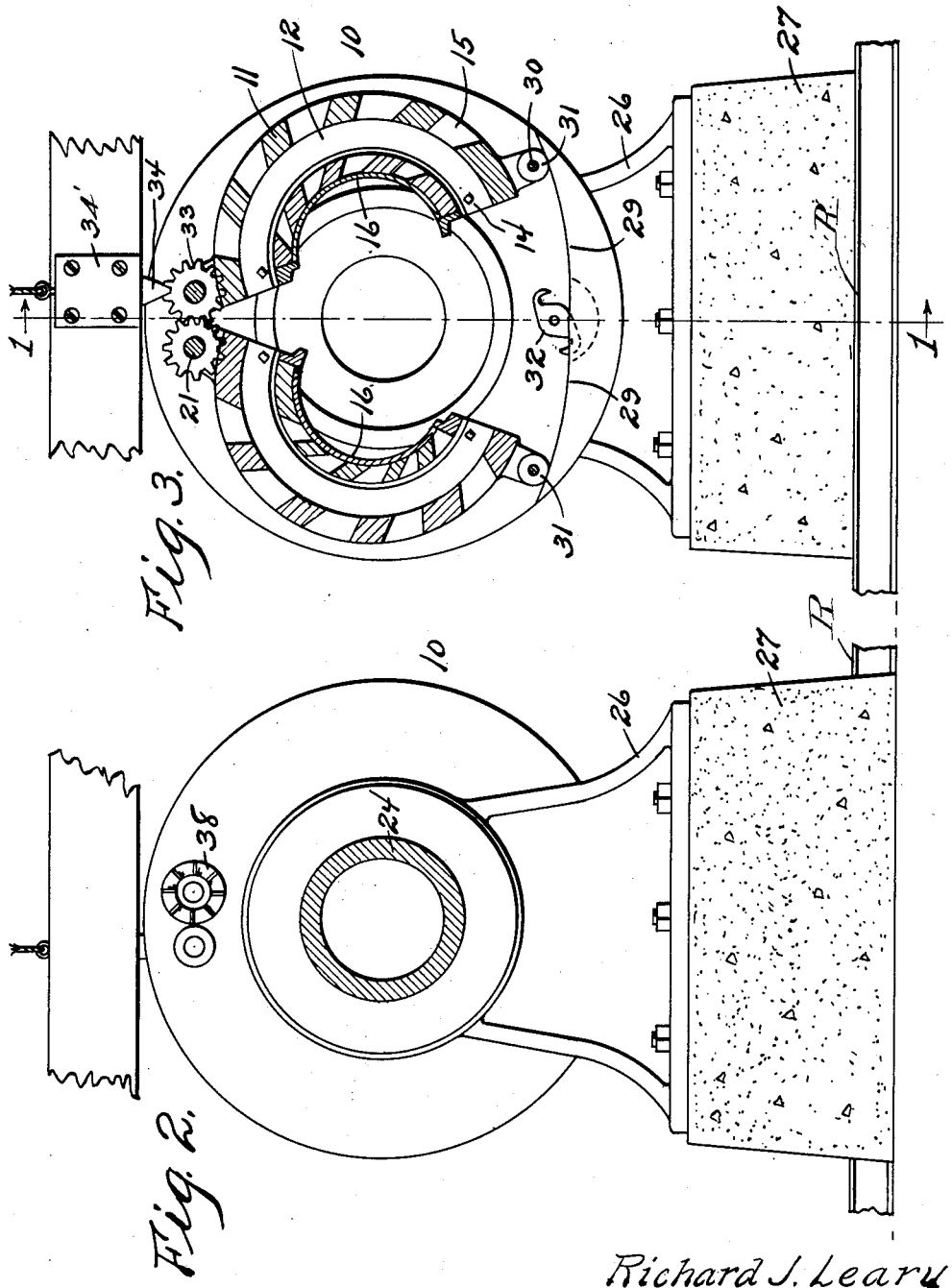

Patented Apr. 13, 1926.

1,580,437

UNITED STATES PATENT OFFICE.

RICHARD J. LEARY, OF BURLINGTON, NEW JERSEY.

MOLDING MACHINE.

Application filed December 12, 1924. Serial No. 755,533.

*To all whom it may concern:*

Be it known that I, RICHARD J. LEARY, a citizen of the United States, residing at Burlington, in the county of Burlington and State of New Jersey, have invented new and useful Improvements in Molding Machines, of which the following is a specification.

This invention relates to improvements in molding machines which are especially adapted for molding pipe or the like, an object being to provide a centrifugally operated machine which is simple in construction, easy to operate and from which the finished product may be conveniently removed.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a molding machine constructed in accordance with the invention and illustrating by dotted lines the manner of charging the machine.

Figure 2 is a sectional view taken substantially on the line 2—2 of Figure 1.

Figure 3 is a similar view taken substantially on the line 3—3 of Figure 1.

Referring to the drawings in detail wherein like characters of reference denote corresponding parts, the molding machine as shown comprises separate mold sections 10. These sections are of like construction and each includes outer and inner spaced semi-cylindrical members 11 and 12, the said members being provided with apertured flanges 13 which are bolted together as indicated at 14 in Figures 1 and 3 of the drawings. The inner and outer members are thus spaced apart to provide for the circulation of air to cool the mold and to facilitate the introduction and circulation of air, the sections 11 and 12 are provided with spaced slots 15. The slots of the outer section 11 communicate with the space between the sections, while the slots of the inner section 12 are closed at one edge by a semi-circular lining 16 which forms the interior wall of the mold. The meeting edges of the inner sections 12 are provided with overlapping strips 16' to provide tight joints when the mold is closed.

At their opposite ends, the inner sections 12 are provided with semi-circular recesses 17 which are adapted to receive cores 18. These cores are provided with annular grooves 19 and are placed at the opposite ends of the mold to form pipe flanges. The grooves 19 are provided with openings for the escape of gas.

The mold sections 10 are mounted for relative pivotal movement and for this purpose the sections are provided with apertured lugs 20 which are spaced along their upper edges and which receive shafts 21. These shafts have bearings in heads 22 at each end of the mold, the bearings being preferably of the anti-friction type as indicated at 23.

The heads 22 have extending therefrom bearing sleeves 24 which are mounted in anti-friction bearings 25 provided in standards 26 at each end of the mold. The standards may be mounted upon suitable foundations 27. At one end of the mold there are provided thrust bearings 28. One of the sleeves 24 may be extended beyond the bearing 25 and may be provided with suitable means (not shown) for revolving the mold. The heads 22 are further provided with curved tracks 29 and operating over these tracks and carried by the shafts 30 which are secured to the mold sections 10, are rollers 31. The mold sections will be thus supported during their pivotal movement. A pivotally mounted locking lever 32 is arranged to engage the shafts 30 and hold the mold sections together. One of these levers 32 is provided at each end of the machine and may be operated by rotating the stud upon which it is mounted and which extends through the heads 22. The levers 32 are provided with bills or hooks at each end which engage the shafts 30 of the mold sections and act to securely hold the sections in closed position.

The shafts 21 have secured thereon pinions 33 which are in mesh, so that when power is applied to one of these shafts, the mold sections will be simultaneously operated. The mold sections may be locked in open position through the medium of a spring latch 34 which is slidingly mounted as shown at 34' and which may be provided with a suitable cord or cable to facilitate its operation. This latch is adapted to engage the teeth of one of the pinions 33 so as to hold said pinions against movement and hold the mold sections separated.

As thus far described, the mold sections are locked together through the medium of the latch 32 and the mold is charged in any suitable or convenient manner. During the charging operation the mold is rotated by applying power to one of the bearing sleeves 24 and centrifugal force will distribute the charge over the inner wall of the mold and throughout the annular groove 19 of the cores 18. Rotation of the mold is continued for a sufficient period and the warm air from the interior of the mold is trapped within the space between the inner and outer mold sections so as to prevent the pipe from cooling too quickly, the warm air mixing with the cool air which passes through and between the mold sections, acts to properly cool the mold so as to prevent the latter from warping. The molded pipe is thus cooled in such manner as not to require annealing, while the life of the mold is materially increased. After the charge has set, rotation of the mold is stopped, the latch 32 being released and the sections opened. The latch 34 is then engaged with one of the pinions so that the sections are held in open position. When the sections of the mold are opened, the pipe will fall downward upon rails R and will roll to one side of the mold.

For the purpose of balancing the mold during its rotation, the shaft 30 carries a number of counterbalance weights 35.

Rotation may be imparted to one of the shafts 21 by any suitable means. In Figure 1 there is illustrated by dotted lines a shaft 36 which may be driven from any suitable source of power and which is provided with a clutch member 37 which is adapted to engage a clutch member 38 carried by one of the shafts 21.

One of the heads 22 which are supported by the bearing sleeves is provided with a stop 57. This stop is adapted to be engaged by a spring actuated plunger or latch 58 which is mounted upon one of the bearing standards 26 so as to hold the mold sections in proper position.

The cores 18 within which the end flanges of the pipe are molded are formed of any suitable material such as fire clay or the like and as the pipe falls from the mold these cores are broken and removed from the flanges. The cores act to prevent the flanges from becoming suddenly chilled by the atmosphere. In addition, as the cores entirely envelop the flanges they prevent the said flanges from locking against the ends of the mold due to shrinkage when the pipe cools and insure proper discharge of the pipe from the mold. Any shrinkage of the pipe would cause a crushing of the cores as the latter would give under the shrinkage, where the ends of the mold would not.

The invention is susceptible of various changes in its form, proportions and minor details of construction and the right is herein reserved to make such changes as properly fall within the scope of the appended claims.

Having described the invention what is claimed is:—

1. A molding machine comprising a pair of semi-cylindrical sections mounted for relative pivotal movement and adapted to be secured together to provide a mold, means connecting the sections to provide for simultaneous pivotal movement, means for supporting the sections during such movement and means for supporting the mold whereby the latter may be rotated.

2. A molding machine comprising a pair of semi-cylindrical sections mounted for relative pivotal movement and adapted to be secured together to provide a mold, means connecting the sections to provide for simultaneous pivotal movement, means for supporting the sections during such movement, means for supporting the mold whereby the latter may be rotated and means engageable with the section moving means to lock the sections in open position.

3. A molding machine comprising a pair of semi-cylindrical sections mounted for relative pivotal movement and adapted to be secured together to provide a mold, annular flange forming sections at each end of the mold, means for removably holding the flange forming sections in position, means connecting the semi-cylindrical sections to provide for simultaneous pivotal movement, means for supporting the semi-cylindrical sections during such movement and means for supporting the mold whereby the latter may be rotated.

4. A molding machine comprising a pair of semi-cylindrical sections mounted for relative pivotal movement and adapted to be secured together to provide a mold, means connecting the sections to provide for simultaneous pivotal movement, a head at each end of the mold, a track provided upon each of the heads, means carried by the mold sections and engaging the track to support said sections during pivotal movement and means extending from the heads whereby the mold may be rotatably supported.

5. A molding machine comprising a pair of semi-cylindrical sections mounted for relative pivotal movement and adapted to be secured together to provide a mold, heads at each end of the mold, spaced parallel shafts journaled in said heads and extending axially of the mold, means connecting the shafts and mold sections whereby rocking movement of the shafts will move the sections relatively to open and close the mold, means connecting the shafts to provide for simultaneous movement, means for supporting the sections during such movement and means for supporting the mold whereby the latter may be rotated.

6. A molding machine comprising a pair of semi-cylindrical sections mounted for relative pivotal movement and adapted to be secured together to provide a mold, each of said sections comprising concentrically arranged radially spaced semi-cylindrical members having openings therein and a lining upon the inner periphery of the inner member, means connecting the sections to provide for simultaneous pivotal movement, means for supporting the sections during such movement and means for supporting the mold whereby the latter may be rotated.

7. A molding machine comprising a pair of semi-cylindrical sections mounted for relative pivotal movement and adapted to be secured together to provide a mold, means connecting the sections to provide for simultaneous pivotal movement, means for supporting the sections during such movement, means for supporting the mold whereby the latter may be rotated and counterbalance elements carried by the mold.

In testimony whereof I affix my signature.

RICHARD J. LEARY.